United States Patent

Inoue

[11] Patent Number: 5,805,999
[45] Date of Patent: Sep. 8, 1998

[54] CORDLESS PHONE SYSTEM AND A METHOD FOR ESTIMATING LOCATION OF A CORDLESS PHONE IN SAID CORDLESS PHONE SYSTEM

[75] Inventor: Akira Inoue, Tokyo, Japan

[73] Assignee: NEC Corporation, Tokyo, Japan

[21] Appl. No.: 600,597

[22] Filed: Feb. 13, 1996

[30] Foreign Application Priority Data

Feb. 15, 1995 [JP] Japan ................................... 7-049294

[51] Int. Cl.⁶ ................................................. H04Q 7/00
[52] U.S. Cl. ........................ 455/462; 455/440; 455/435; 455/439
[58] Field of Search .................................. 455/462, 435, 455/433, 458, 457, 464, 403, 436, 437, 439, 440, 446, 423, 67.1, 456, 432; 342/357, 457; 379/45

[56] References Cited

FOREIGN PATENT DOCUMENTS

| | | |
|---|---|---|
| 3516357A1 | 11/1986 | Germany . |
| 239738 | 2/1990 | Japan . |
| 5297107 | 11/1993 | Japan . |
| 5327603 | 12/1993 | Japan . |
| 2267795 | 12/1993 | United Kingdom . |
| WO 9213284 | 8/1992 | WIPO . |
| WO 9422240 | 9/1994 | WIPO . |

*Primary Examiner*—Dwayne D. Bost
*Assistant Examiner*—Jean D. Aristilde
*Attorney, Agent, or Firm*—Whitham, Curtis & Whitman

[57] ABSTRACT

Each base station transmits a signal including its own identification code. A cordless phone generates a plurality of pair information corresponding an identification code to a detected reception level based on a signal from each base station, selects pair information having largest reception level from among said plurality of pair information, and estimates a base station base on the pair information corresponding to the selected reception level. The cordless phone comprises a display section for displaying an estimated base station.

8 Claims, 9 Drawing Sheets

2A~2D: BASE STATION
3A~3C: CORDLESS PHONE

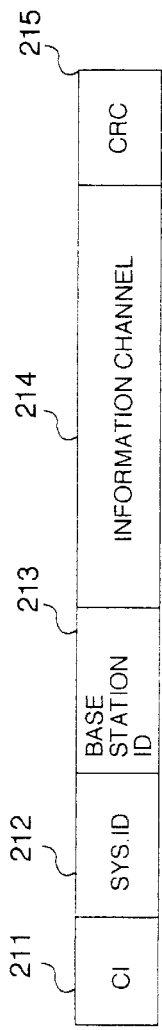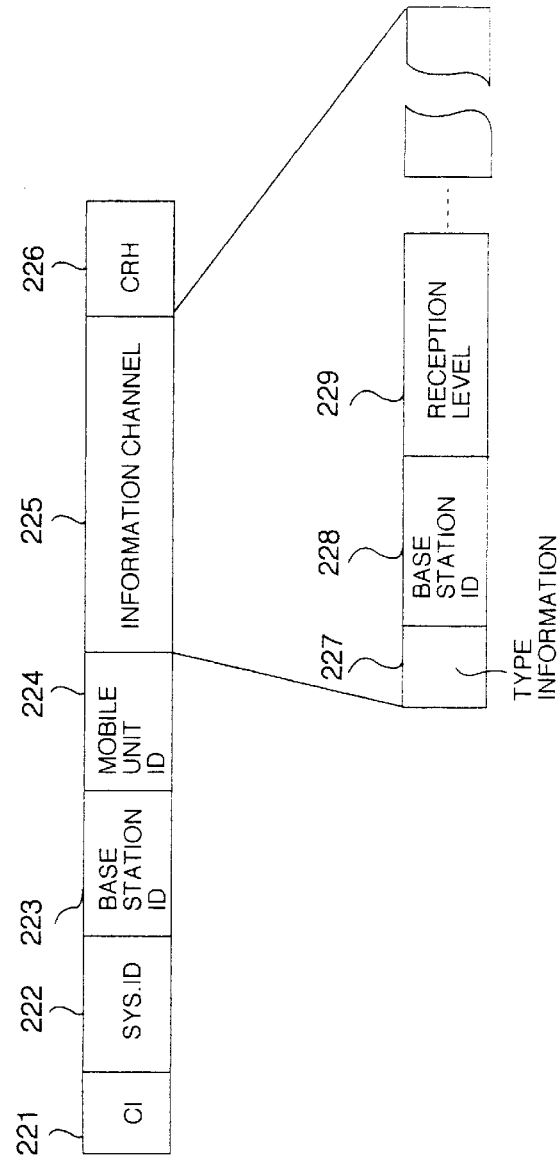

2A~2D: BASE STATION
3A~3C: CORDLESS PHONE

CORDLESS PHONE SYSTEM AND A METHOD FOR ESTIMATING LOCATION OF A CORDLESS PHONE IN SAID CORDLESS PHONE SYSTEM

BACKGROUND OF THE INVENTION

This invention relates to a cordless phone system, and more specifically an art to estimate a nearest base station to location of a cordless phone.

In a conventional cordless phone system, a cordless phone registers its location to one of several dispersed base stations for radio communication therebetween. When the reception level of a radio wave sent from the communicating base station is lowered owing to moving of the cordless phone, normal communication is hindered. In such a case, another base station sending a radio wave at a predetermined or higher reception level is searched and then the cordless phone registers its location to the searched base station.

For example, a cordless phone system employed in a plant and the like must to detect the location of the cordless phone carried by a person to be called or managed. This system allows the management to detect the base station registered by the cordless phone so that the cordless phone is assumed to be in the vicinity of the detected base station.

Conventionally each radio zone of neighboring base stations is set to partially overlap its adjacent zones in order to eliminate dead zone where signal transmission/reception is not available. Therefore, the present location of the cordless phone is not always the nearest to the base station registered thereby, leading to an error in assuming the cordless phone location.

To overcome the aforementioned problem, the prior art location registration method has been provided in which the base station detects the reception level of each cordless phone and registers its location. For example, in a Publication of a Japanese Patent Application Laid Open No.39738 (1990), a plurality of fixed units (base stations) detect the reception level of signals from the cordless phone (cordless phone) and send information of the detected reception levels to the radio phone. Based on the information of reception levels, the cordless phone selects the nearest fixed unit and registers its location. In the aforementioned prior art, the cordless phone registers its location based on the reception level between the cordless phone and a plurality of fixed units, which improves accuracy of location registration to the nearest fixed unit. In this system, however, each fixed unit is required to have a reception level detection section for detecting the reception level of the cordless phone, resulting in a complicated structure of the fixed unit.

As a related art to the above, there is an art disclosed in the Japanese Patent Application Laid Open No. 297107 (1993). In this art, a cordless phone receives the waves from base stations and measures their electric power. Then, it selects three waves having the first strongest electric power to the third strongest electric power from among the received waves and detects three base station's ID codes from the waves. Calculating distances to respective base stations based on the measured electric power, the cordless phone finds its location based on map information.

SUMMARY OF THE INVENTION

It is an object of the present invention to provide solutions for the aforementioned problems.

It is another object of the present invention to provide a cordless phone system by which the cordless phone side itself can estimate the nearest base station and the owner of the cordless phone can find its location and a method for estimating the nearest base station.

The object of the present invention is achieved by a cordless phone system comprising: an exchange office; a plurality of base stations connected with the exchange office; and at least one cordless phone for radio-communication with the base stations, wherein each of the plurality of base stations comprises means for transmitting a signal including a base station identification code identifying each base station, and wherein the cordless phone comprises: detection means for detecting a reception level of the signal including the base station identification code transmitted from the each base station; and estimation means for estimating a nearest base station based on the reception level of each reception signal detected in the detection means and the base station identification code included in the each reception signal.

Furthermore, the object of the present invention is achieved by a location estimation method of a cordless phone in a cordless phone system having an exchange office, a plurality of base stations connected with the exchange office and at least one cordless phone for radio-communication with the base stations, the location estimation method comprising steps of: transmitting a signal including a base station identification code identifying each base station in each of the base stations; receiving the signal including a base station identification code transmitted from the each base station in the cordless phone; and estimating a nearest base station based on the reception level of each reception signal and the base station identification code included in the each reception signal in the cordless phone.

In the present invention, a plurality of base stations transmit signals including respective identification codes. The cordless phone generates a plurality of pair information indicating each identification code and corresponding detected reception level based on signals from the base stations, selects pair information having the largest reception level from among the plurality of pair information and estimates a base station based on pair information corresponding to the selected reception level. In addition, the cordless phone comprises a display section for displaying an estimated base station.

Moreover, the present invention can to be formed such that a computer is connected with an exchanger connected with each base station, pair information generated in a cordless phone is transmitted to the computer via the base station, pair information having the largest reception level is selected from among a plurality of pair information in the computer, a base station is estimated based on pair information corresponding to a selected reception level and a location display of the cordless phone is conducted.

Furthermore, the present invention can to be formed such that a personal computer is located at an arbitrary place, pair information generated in a cordless phone connected with the personal computer is input to the personal computer, pair information having largest reception level is selected from among a plurality of pair information in the personal computer, a base station is estimated based on pair information corresponding to a selected reception level and a location display of the cordless phone is conducted.

BRIEF DESCRIPTION OF THE DRAWINGS

These and other objects, features and advantages of the present invention will become more apparent upon a reading of the following detailed description and drawings, in which:

FIG. 2A is a figure showing a format of a down link signal from each base station;

FIG. 2B is a figure showing a format of an up link signal transmitted from each of the cordless phones 3A to 3C;

DESCRIPTION OF THE PREFERRED EMBODIMENTS

A first embodiment of the present invention is described below.

Figure 1:
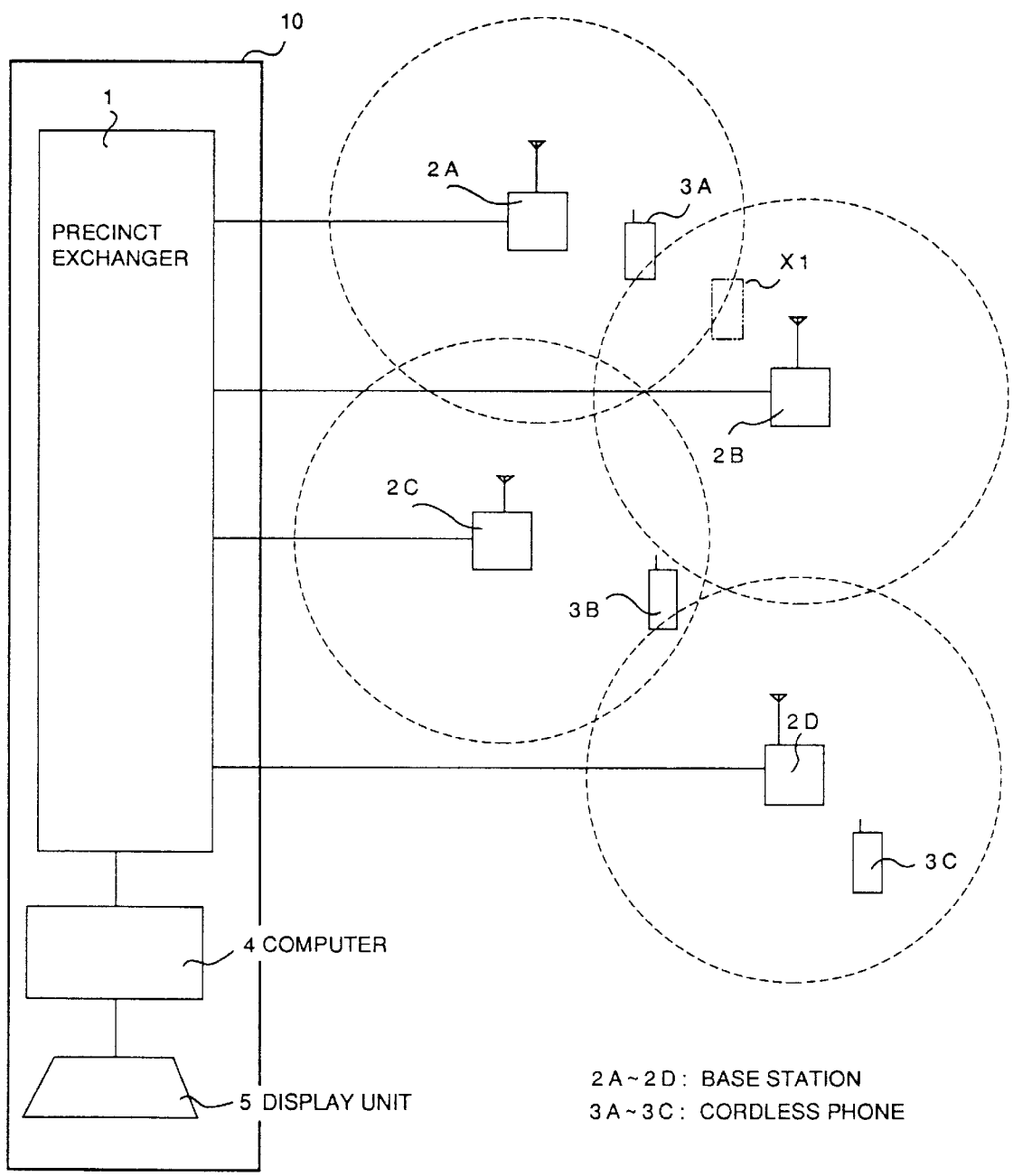
FIG. 1 is a system diagram of a first embodiment of the present invention.

FIG. 1 is a system diagram of the first embodiment of the present invention. In the present embodiment, the present invention is applied to a precinct cordless phone system where a plurality of base stations are connected with a precinct exchanger in an exchange office, and the base stations form radio zones which overlap each other.

In the FIG. 1, item 10 is an exchange office, 1 is a precinct exchanger in the exchange office 10, items 2A to 2D are base stations which are connected to the precinct exchanger 1 with wire and items 3A to 3C are cordless phones which are radio connected with the base stations.

The exchange office 10 comprises the precinct exchanger 1, a computer 4 connected with the precinct exchanger 1 and a display unit 5 connected with the computer 4.

The precinct exchanger 1 receives pair information described later transmitted from the cordless phones 3A to 3C via the base stations 2A to 2D, and outputs these pair information to the computer 4. The computer 4 estimates a nearest base station to the cordless phone that has transmitted the pair information. The display unit 5 has a map indicating respective base stations, and displays an existence of a cordless phone that has transmitted pair information to a column of a nearest base station which has been estimated by the computer 4.

A plurality of base stations 2A to 2D are designed so as to send out radio signals including their own identification code.

Referring to FIGS. 2A and 2B, formats of the signal transmitted from each base station and the signal transmitted from the cordless phones 3A to 3C to the exchange office 10 via the base station are explained.

FIG. 2A is a figure showing a format of a signal from each base station, and FIG. 2B is a figure showing a format of a signal transmitted from each of the cordless phones 3A to 3C to the exchange office 10 via the base station.

In FIG. 2A, bit field 211 is Channel identity and bit field 212 is System identity. Bit field 213 is an identification code of a base station that transmits a signal. Bit field 214 is an information channel and bit field 215 is Cyclic redundancy check.

In FIG. 2B, bit field 221 is Channel identity and bit field 222 is System identity. Bit field 223 is an identification code of an addressed base station. It is usually an identification code of a base station that is location registered. Bit field 224 is an identification code of a mobile unit that transmits a signal. Bit field 225 is an information channel in which pair information generated by the mobile unit is inserted. The information channel 225 comprises type information 227 to indicate a pair of pair information, the identification code 228 of the base station and the signal reception level 229 transmitted by the base station.

Figure 3:
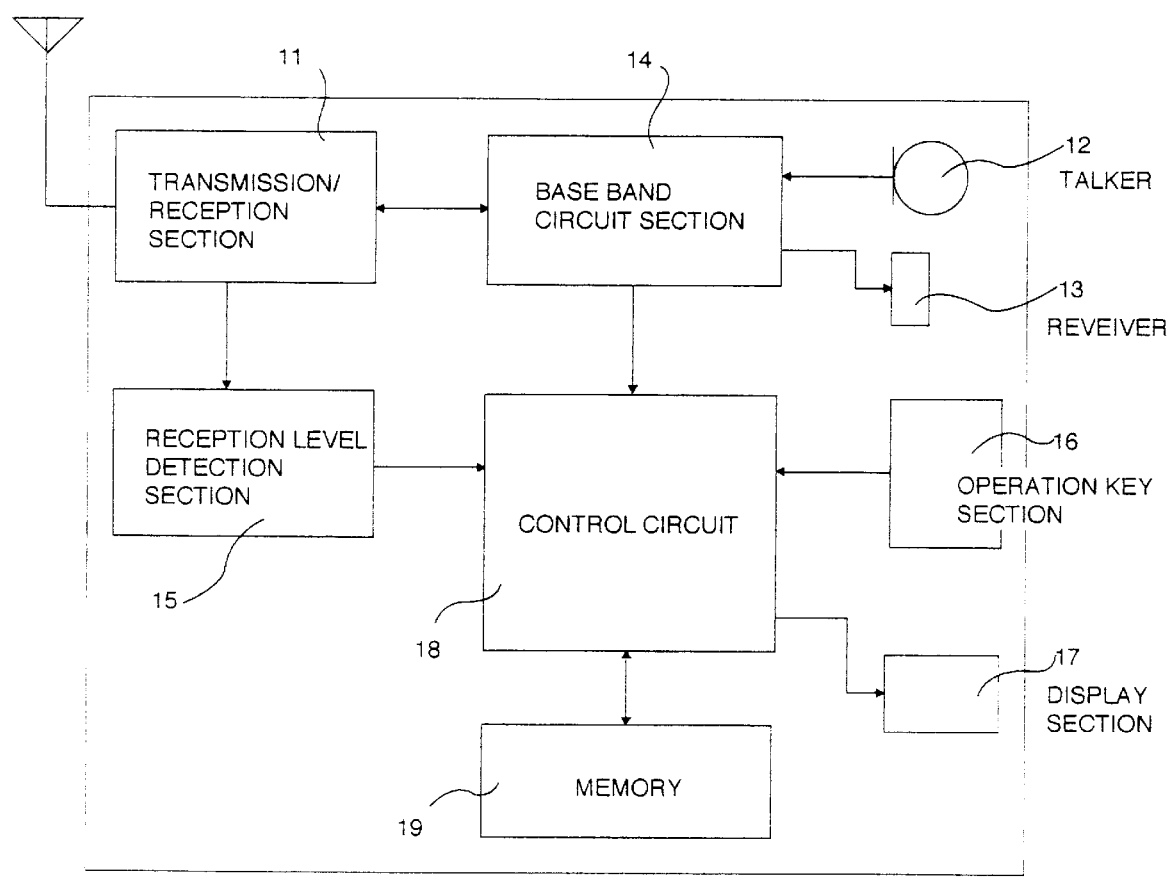
FIG. 3 is a block diagram of the cordless phones 3A to 3C.

Next, the cordless phone 3A to 3C are explained. FIG. 3 is a block diagram of each of the cordless phone 3A to 3C. Each of the cordless phone 3A to 3C comprises a transmission/reception section 11, a talker 12, a base band circuit section 14 to which a receiver 13 is connected, a reception level detection section 15 connected with the transmission/reception section 11 for detecting reception levels of reception signals, a control circuit 18 to which an operation key section 16 and a display section 17 are connected for processing detected reception levels and controlling the sections and a memory circuit 19 consisted of ROMs, RAMs and the like.

The control circuit 18 generates pair information associating a reception level detected in the reception level detection section 15 to an identification code included in a signal received in the transmission/reception section 11, for each signal transmitted from the base stations 2A to 2D. Then, reception levels of a plurality of pair information are compared to each other, and the pair information having the largest reception level is selected. A base station identified by an identification code of a selected pair information is estimated as a nearest base station. Also, the control circuit 18 has a function to add an identification number of its own cordless phone to the generated pair information, and transmit the pair information to the base station 2A to 2D that are presently location registered via the transmission/reception section 11. It is to be noted that location registration to the base station follows a conventional sequence, regardless of the present embodiment. In addition, the control circuit 18 can be constructed using a universal chip, for example, "V40HL" (an MPU produced by NEC).

Next, an operation of the first embodiment is explained. Here, it is supposed that a base station that is location registered is used as a base station that is used when pair information is transmitted to an exchange office via a base station.

First, it is supposed that the cordless phone 3A registers its location to the base station 2A. When the cordless phone 3A moves to the point x1 near to the base station 2B, the radio wave from the base station 2A becomes weak. However, while the reception level of the radio wave from the base station 2A that is detected in the reception level detection section 15 is higher than a preset threshold value, the control circuit 18 does not update any location registration. At this time, the cordless phone 3A receives signals from the base stations 2A to 2D in the transmission/reception section 11 and detects their identification codes. Simultaneously, it detects their reception levels in the reception level detection section 15 and generates pair information associating each base station's identification code to each reception level in the control circuit 18. Sequentially, it compares reception levels of respective pair information and selects the pair information having the largest reception level. Then, it estimates that the nearest base station to its own cordless phone is a base station identified by an identification code of the selected pair information.

For example, the reception levels of the base stations 2A to 2D are 80 dB$\mu$m, 30 dB$\mu$m, 20 dB$\mu$m and 10 dB$\mu$m respectively, it is estimated that the cordless phone 3A located at a point nearest to the base station 2A. On the other hand, if the reception levels of the base stations 2A to 2D are 30 dB$\mu$m, 80 dB$\mu$m, 20 dB$\mu$m and 10 dB$\mu$m respectively, it is estimated that the cordless phone 3A is located at a point nearest to the base station 2B and in the side of the base station 2A.

Figure 4:
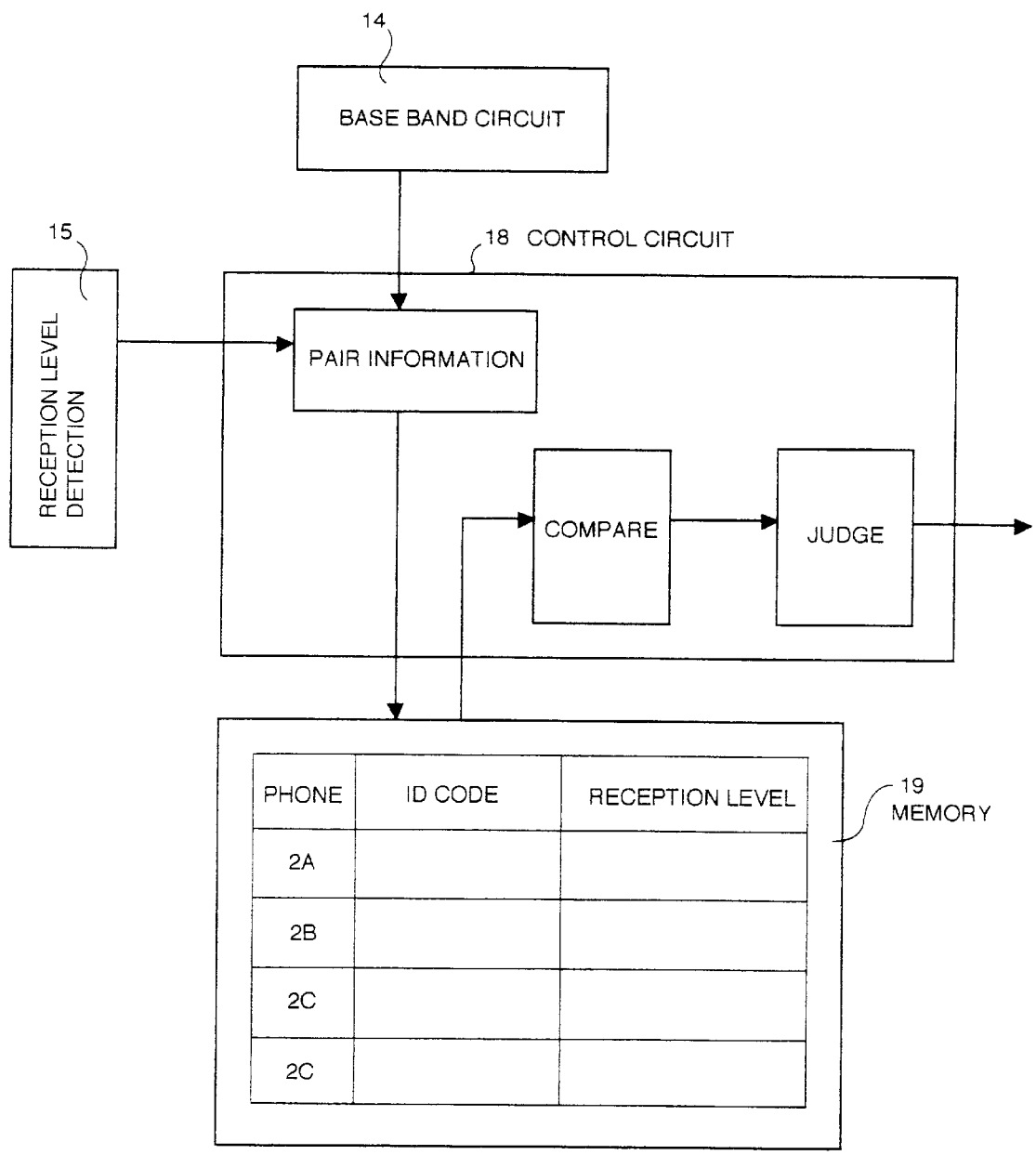
FIG. 4 is a figure showing a construction of a control circuit 18.

FIG. 4 is a figure for showing a construction and sequences of the control circuit 18 conducting estimation operation. For example, having received a signal from the base station 2A, the control circuit 18 decodes an identification code included in the signal. The reception level detection section 15 detects a reception level of the signal. Then, pair information indicating a pair of the reception level and an identification code corresponding to the reception level is generated and the pair information is stored in a predetermined address of the memory 19. Next, in a manner similar to the above, a signal from the base station 2D is received and pair information is generated. The pair information is stored in an address next to the above of the memory 19. All receivable signals from the base stations are received, and a plurality of pair information is generated and stored in the memory 19. Next, pair information of the base stations 2A to 2D stored in addresses of the memory 19 are read, reception levels thereof are compared and the largest reception level is selected. A base station identified by an identification number corresponding to the largest reception level is estimated as a nearest base station. The control circuit 18 displays the base station that is estimated as a nearest station on the display section 17. Thus, the owner of the cordless phone can recognize the nearest base station to the owner.

Figure 5:
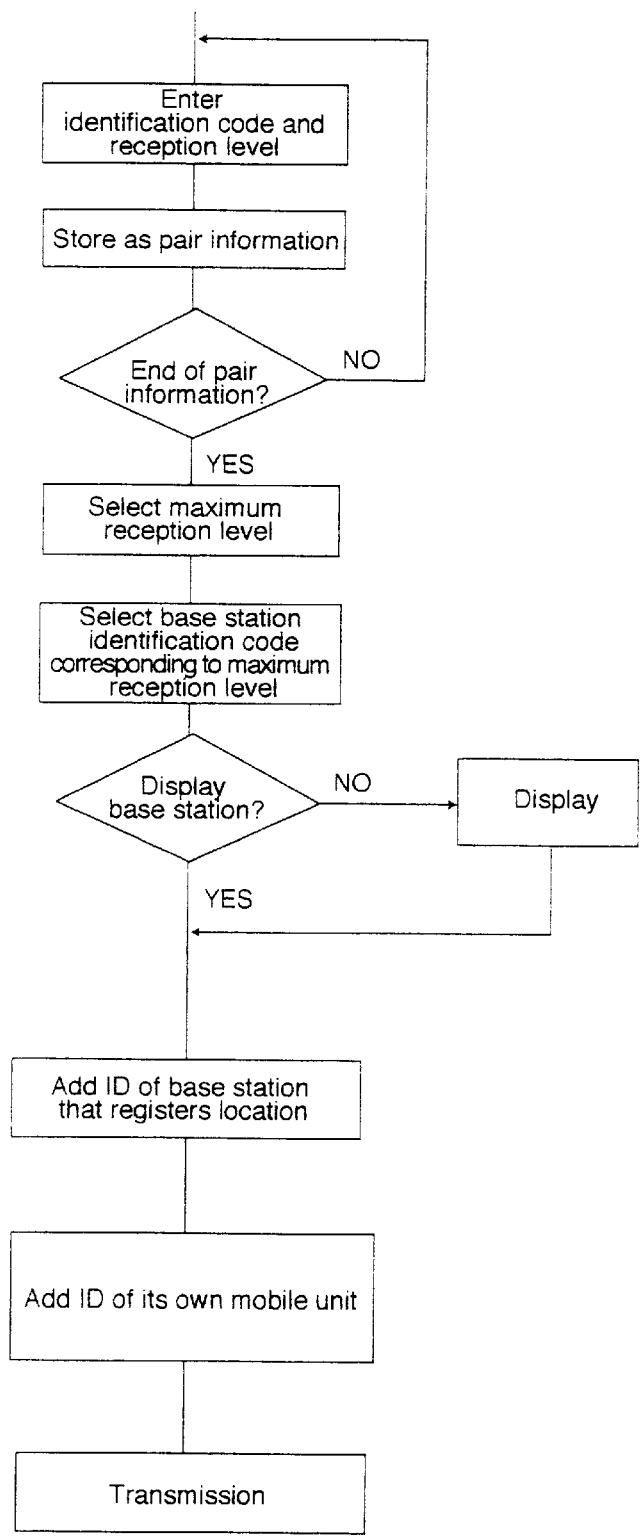
FIG. 5 is an operation flow chart of the control circuit 18.

In FIG. 5, an operation flow chart of the control circuit 18 is shown.

In addition, the control circuit 18 transmits the generated pair information to the precinct exchanger 1 via the location registered base station 2A from the transmission/reception section 11. Then, the precinct exchanger 1 transmits the received pair information to the computer 4. The computer 4 compares reception levels of the pair information based on these pair information similarly to the operation of the control circuit 18 of the cordless phone 3A and estimates a nearest base station to the cordless phone 3A. Finally, the location of the cordless phone 3A is displayed on the map on the display unit 5.

For example, pair information transmitted from the cordless phone 3A are (A (identification code identifying the base station 2A), 30 dB$\mu$m), (B (identification code identifying the base station 2B), 80 dB$\mu$m), (C (identification code identifying the base station 2C), 20 dB$\mu$m) and (D (identification code identifying the base station 2D), 10 dB$\mu$m), the computer selects the (B (identification code identifying the base station 2B), 80 dB$\mu$m) from the four pair information, because it is the pair information having the largest reception level. The computer estimates that the base station 2B identified by the identification code B of the pair information is the base station nearest to the cordless phone 3A. Sequentially, the computer 4 displays existence of a cordless phone 3A in a column of the base station 2B on the map of the display unit 5. It is to be noted that the display the unit 5 can display location of all cordless phones 3A to 3C that are used in this system. Therefore, using the display of the display unit 5, the location of the all cordless phones in the precinct can be displayed, so the location of an owner of a cordless phone can be found.

Figure 6:
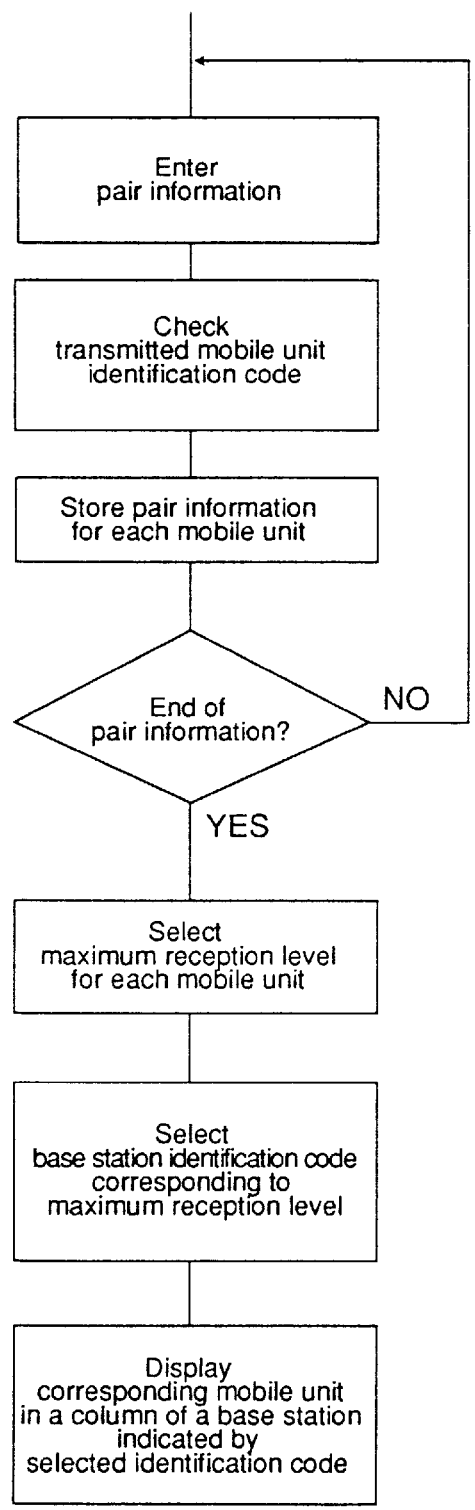
FIG. 6 is an operation flow chart of the computer 4.

In FIG. 6, an operation flow chart of the computer 4 is shown.

Described as above, in the present invention, the cordless phone can independently estimate a nearest base station, so the owner of the cordless phone can find its own location. Each base station does not need to comprise means for detecting reception levels of signals from the cordless phones, so the construction becomes simple. In addition, there is no need to conduct complicated sequences to transmit/receive signals to/from the cordless phones when estimating location in the cordless phone, so the location detection operation can be done rapidly.

Next, the second embodiment is explained.

In the second embodiment, the control circuits 18 in the cordless phones 3A to 3C only generate pair information. Estimation of the nearest base station is performed by the personal computer that is set at an arbitrary place.

Figure 7:
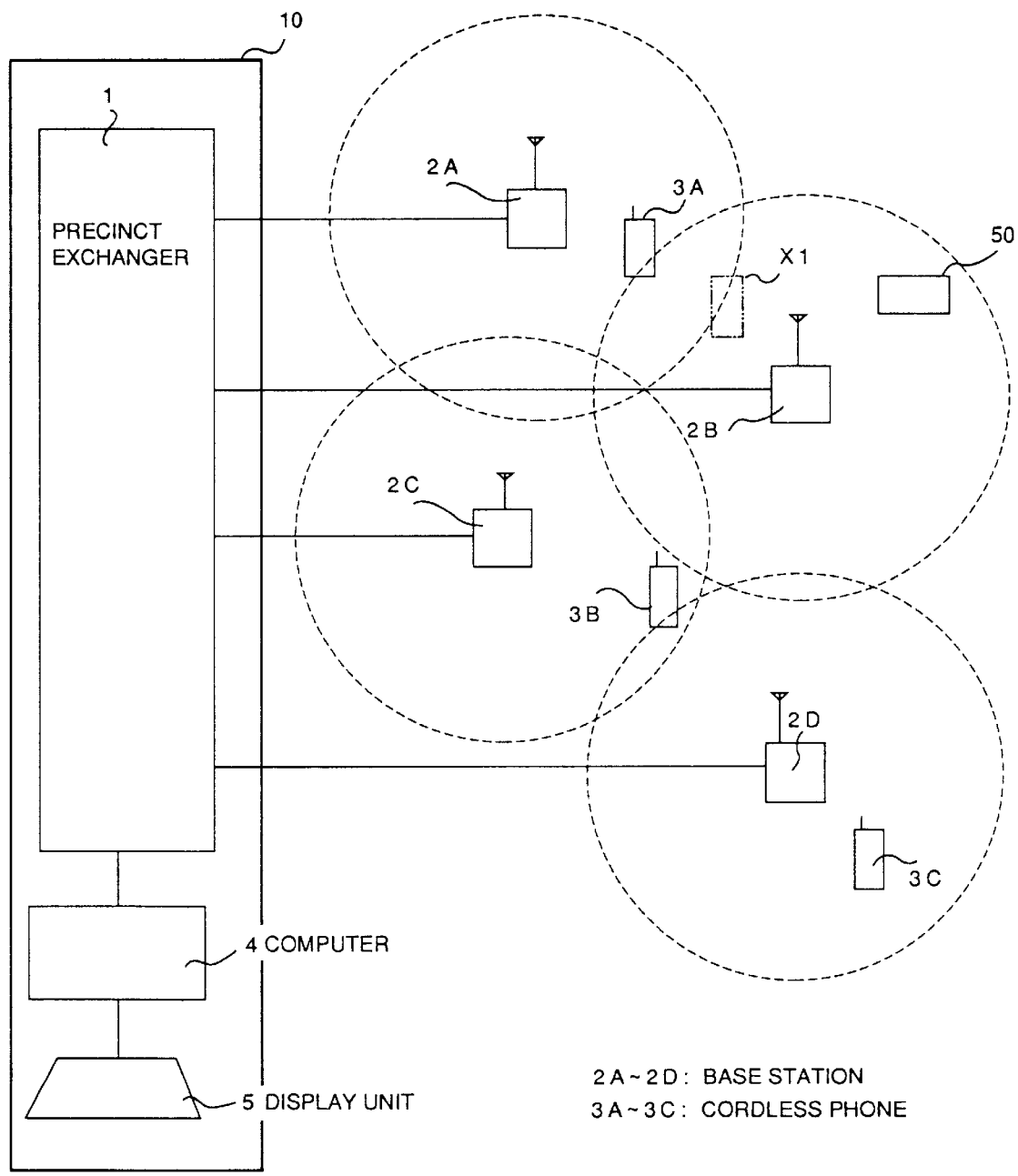
FIG. 7 is a system diagram of a second embodiment of the present invention.

FIG. 7 is a system diagram of the second embodiment. In this figure, the system construction is the same as that of the first system in FIG. 1 except for the personal computer 50, so explanations for the components having the same number as that of FIG. 1 are omitted. The personal computer 50 is located at an arbitrary place or at the side of the cordless phone. For example, it may be a portable computer that is with the owner of the cordless phone.

Figure 8:
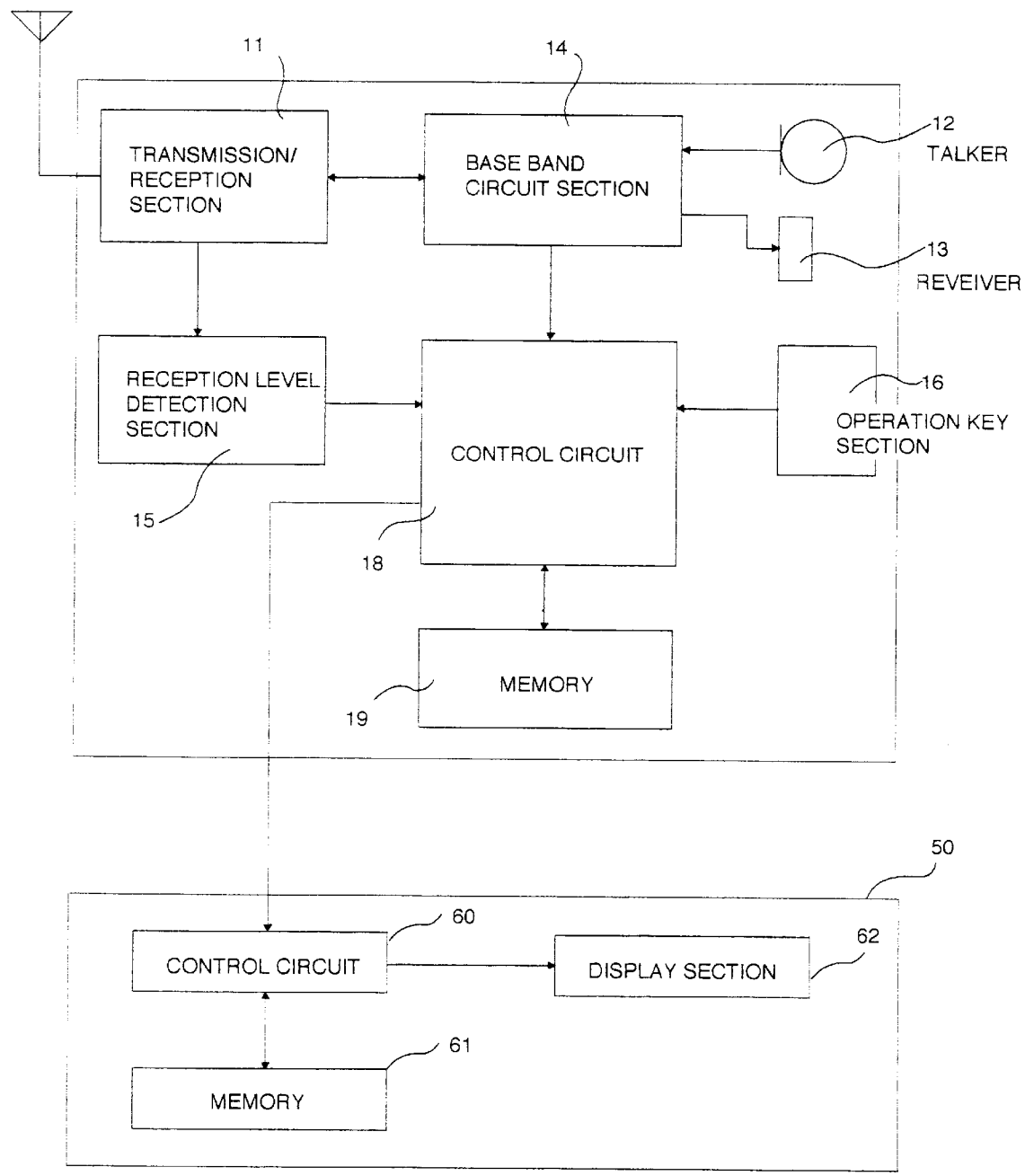
FIG. 8 is a block diagram of the cordless phone and a personal computer.

FIG. 8 is a block diagram of the cordless phone and the personal computer. The cordless phone 3A to 3C and the personal computer 50 can be connected with a connector (not shown).

The control circuit 18 of the cordless phone 3A to 3C only generates pair information described in the first embodiment, the generated pair information is stored in the memory 19. The cordless phone 3A to 3C does not have a display section 17 for displaying a nearest base station.

When being connected with the cordless phones 3A to 3C, the control circuit 60 of the personal computer 50 receives pair information from the cordless phones 3A to 3C, and stores them in the memory 61 once. Then, it selects the largest reception level from among stored pair information, estimates a base station identified by the selected pair information as a nearest base station and displays the base station on the display section 62. Constructed like this, the construction of the cordless phone can be simple.

Figure 9:
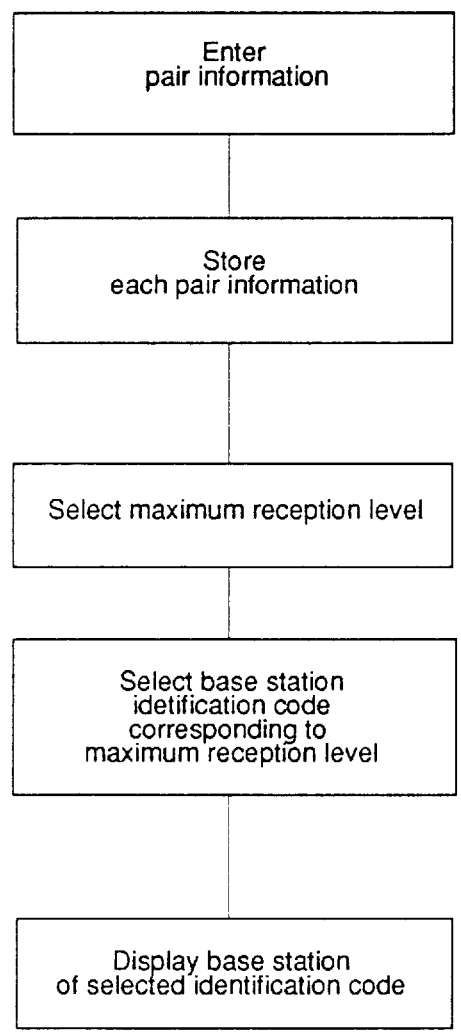
FIG. 9 is an operation flow chart of the control circuit 60.

In FIG. 9, an operation flow chart of the control circuit 60 of the personal computer 50.

In addition, similarly to the first embodiment, by giving a function to transmit pair information to the precinct exchanger 1 via a location registered base station to the control circuit 18 of the cordless phones 3A to 3C, the exchange office 10 can control cordless phones in a manner similar to the first embodiment.

Also, by giving a function to generate pair information of an identification code and a reception level received by a cordless phone to the personal computer 50, the cordless phone is sufficient to comprise a function to receive a reception level and an identification code, thus constructions of the cordless phone become simple.

In the above embodiments, the present invention is applied to a precinct exchange as an example. However, it is possible to apply the present invention to a cordless phone system using an exchange office.

Described as above, in the present invention, each base station does not need to comprise means for detecting reception levels of signals from the cordless phones, so the construction of the base station becomes simple. In addition, there is no need to conduct complicated sequences to transmit/receive signals to/from the cordless phones when estimating location in the cordless phone, the location detection operation can be done rapidly. Thus, the owner of the cordless phone can estimate its own location.

Moreover, in the present invention, a computer is connected with an exchange office connected to the base stations, and the computer detects the location of a cordless phone based on pair information generated by the cordless phones. Through these operations, a plurality of cordless phones are displayed on a display unit and location control or the like is possible. Even in this method, location estimation is possible using only signals received by the cordless phones, so construction of the base station does not become complicated.

Furthermore, in the present invention, by connecting a cordless phone with a personal computer set at an arbitrary place and conducting the personal computer location estimation and location displaying based on pair information, location displaying becomes possible even if the cordless phone does not comprise a control circuit for detecting location or a display section. Thus, the construction of the cordless phone becomes simple. In addition, in this case, location estimation can be done using only signals received by the cordless phone, so the construction of the base station does not become complicated.

What is claimed is:

1. A cordless phone system comprising:
    an exchange office;
    a plurality of base stations connected with said exchange office,
        each of said base stations having means for transmitting a base station signal having a base station identification code identifying the transmitting base station; and
    at least one cordless phone for radio-communication with said base stations, said cordless phone having:
        detection means for receiving a plurality of said base station signals and detecting a reception level of each of said plurality;
        estimation means for estimating a nearest base station based on said reception levels detected by said detection means and on said base station identification code included in each of said received base station signals, said estimation means comprising:
            means for generating a plurality of pair informations, each of said plurality representing, for a corresponding one of the plurality of received base station signals, the reception level detected by said detection means and the base station identification code included in the corresponding received base station signal; and
            means for selecting from said plurality of pair informations a pair information representing the largest of said detected reception levels, and for estimating a nearest base station according to the base station identification code of the selected pair information,
    wherein said cordless phone further comprises:
        means for adding to said plurality of pair informations a phone identification code identifying said cordless phone; and
        means for transmitting a pair information code to said exchange office via an arbitrary exchange office, said pair information code representing said plurality of pair informations and said added phone identification code; and wherein said exchange office further comprises:
    selection means for selecting a pair information representing a largest reception level from among a plurality of said pair informations represented by said pair information code; and
    display means for displaying that a nearest base station to a cordless phone identified by the phone identification code added to said selected pair information is the base sation represented by the identification code of said selected pair information.

2. The cordless phone system of claim 1, wherein
    said selection means receives pair information from a plurality of cordless phones and selects pair information, for each cordless phone, of which reception level is largest from among pair information transmitted by said each cordless phone; and
    said display means displays that a nearest base station to a cordless phone identified by a phone identification code which is added to a selected pair information is the base station identified by a base station identification code of said selected pair information for each cordless phone.

3. A cordless phone system comprising:
    an exchange office;
    a plurality of base stations connected with said exchange office; and
    at least one cordless phone for radio-communication with said base stations,
    wherein
        each of said of base stations comprises means for transmitting a signal including a base station identification code identifying each base station;
        said cordless phone comprises:
            detection means for detecting a reception level of said signal including said base station identification code transmitted from said each base station;
            means for generating pair information indicating a pair of a detected reception level and a base station identification code included in a reception signal corresponding to said reception level for each reception signal; and
            means for selecting pair information of which reception level is largest from among a plurality of pair information and estimating a base station identified by a base station identification code of selected pair information as a nearest base station;
            display means for displaying an estimated nearest base station;
            means for adding a phone identification code identifying itself to generated pair information;
            means for transmitting said pair information added by said phone identification code to said exchange office via an arbitrary exchange office; and
        said exchange office comprises:
            selection means for selecting pair information of which reception level is largest from among a plurality of received pair information; and
            display means for displaying that a base station of a cordless phone identified by a phone identification code which is added to said pair information is the base station identified by a base station identification code of pair information selected by said selection means.

4. The cordless phone system of claim 3, wherein
    said selection means of said exchange office receives pair information from a plurality of cordless phones and selects pair information, for each cordless phone, of which reception level is largest from among pair information transmitted by said each cordless phone; and said display means of said exchange office displays a nearest base station to each cordless phone.

5. A location estimation method of a cordless phone in a cordless phone system having an exchange office, a plurality of base stations connected with said exchange office and at least one cordless phone for radio-communication with said base stations, said location estimation method comprising steps of:

transmitting from each of said plurality of base stations a corresponding base station signal having a base station identification code identifying the transmitting base station;

receiving said base station signals at said cordless phone;

detecting a reception level at said cordless phone for each of said received base station signals; and estimating a nearest base station based on said detected reception level and said base station identification code included in each of said base station signals received at said cordless phone, wherein said step of estimating a nearest base station comprises steps of:

generating a plurality of pair informations, each of said plurality representing for a corresponding one of the plurality of received base station signals the reception level detected by said detecting step and the base station identification code included in the corresponding received base station signal;

selecting from said plurality of pair informations a pair information representing the largest reception level; and estimating a nearest base station according to the base station identification code of the selected pair information, and wherein said location estimation method further comprises steps of:

adding a phone identification code to said plurality of pair informations, said phone identification code identifying said cordless phone;

transmitting a signal having said plurality of pair informations and said added phone identification code identifying said cordless phone to said exchange office via an arbitrary base station;

receiving said signal at said exchange office;

selecting a pair information having the largest reception level from among a plurality of pair informations in said received signal; and displaying a base station identified by a base station identification code of said selected pair information as a nearest base station to a cordless phone identified by a phone identification code in said selected pair information.

6. A cordless phone system comprising:

an exchange office:

a plurality of base stations connected with said exchange office, each of said base stations having means for transmitting a base station signal having a base station identification code identifying the transmitting base station;

at least one cordless phone for radio-communication with said base stations, said cordless phone having:

detection means for receiving a plurality of said base station signals and detecting a reception level of each of said plurality; and means for generating a plurality of pair informations, each of said plurality representing, for a corresponding one of the plurality of received base station signals, the reception level detected by said detection means and the base station identification code included in the corresponding received base station signal; and at least one information processing unit having:

means for receiving said pair information from said cordless phone;

means for selecting pair information of which reception level is largest from among a plurality of received pair information; and display means for displaying that a nearest base station to said cordless phone the base station identified by a base station identification code of selected pair information;

wherein said cordless phone further comprises:

means for adding to said plurality of pair informations a phone identification code identifying said cordless phone;

means for transmitting a signal to said exchange office via an arbitrary exchange office, said signal having said plurality of pair informations and said added phone identification code; and wherein said exchange office comprises:

means for receiving said signal;

selection means for selecting from said received signal a pair information having a largest reception level from among a plurality of pair informations; and display means for displaying that a nearest base station to a cordless phone identified by the phone identification code added to said selected pair information is the base station identified by a base station identification code of said selected pair information.

7. The cordless phone system of claim 6, wherein said selection means receives pair information from a plurality of cordless phones and selects pair information of which reception level is largest for each pair information of each cordless phone; and said display means displays that a nearest base station to a cordless phone identified by a phone identification code which is added to a selected pair information is the base station identified by a base station identification code of said selected pair information for each cordless phone.

8. A location estimation method of a cordless phone in a cordless phone system having an exchange office, a plurality of base stations connected with said exchange office, at least one cordless phone for radio-communication with said base stations and at least one information processing unit, said location estimation method comprising steps of:

transmitting from each of said plurality of base stations a corresponding base station signal having a base station identification code identifying the transmitting base station;

receiving said base station signals at said cordless phone;

detecting a reception level at said cordless phone for each of said received base station signals;

generating a plurality of pair informations, each of said plurality representing, for a corresponding one of the plurality of received base station signals, the reception level detected by said detecting step and the base station identification code included in the corresponding received base station signal;

receiving said generated plurality of pair informations at said information processing unit;

selecting from said received plurality of pair informations a pair information representing the largest of said reception levels;

displaying a base station identified by the base station identification code of the pair information selected by said selecting step as a nearest base station to a cordless phone having transmitted said pair information to said information processing unit;

adding a phone identification code identifying said cordless phone to said pair information in said cordless phone;

transmitting a signal having said plurality of pair informations and said added phone identification code to said exchange office via an arbitrary base station;

receiving said signal at said exchange office;

selecting a pair information having the largest reception level from among a plurality of pair informations in said received signal; and displaying a base station identified by a base station identification code of said selected pair information as a nearest base station to a cordless phone identified by a phone identification code in said selected pair information.

* * * * *